Sept. 11, 1956 R. H. PREWITT 2,762,419
METHOD AND APPARATUS FOR FABRICATING AIRFRAMES
Original Filed Sept. 2, 1948 3 Sheets-Sheet 1
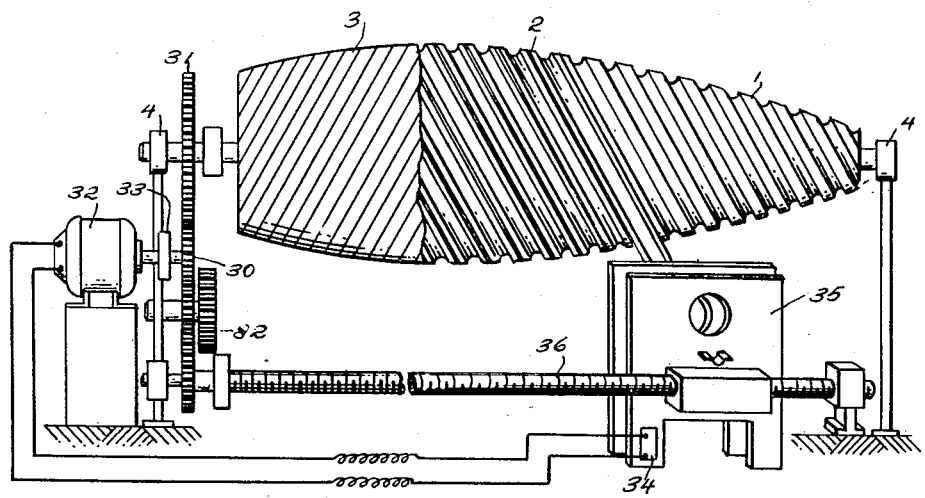
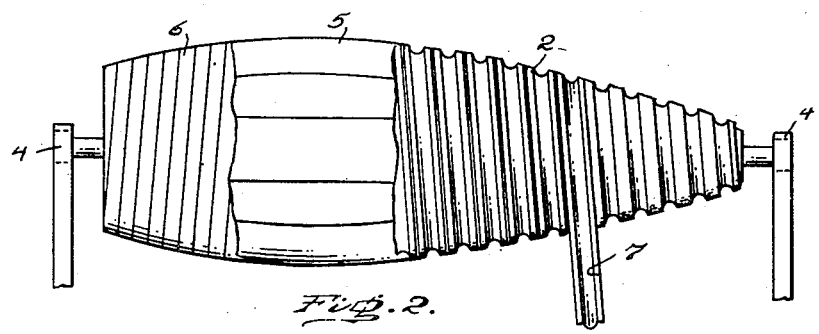
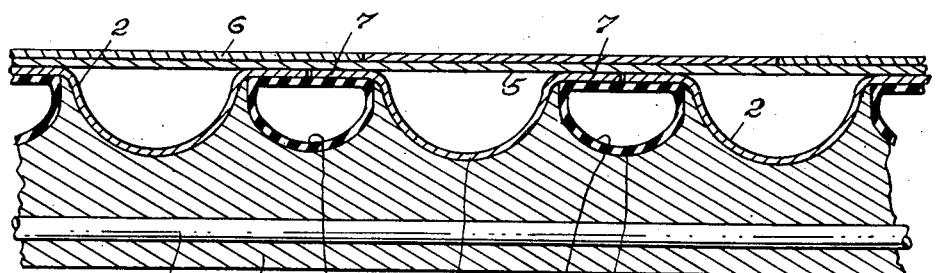
INVENTOR
RICHARD H. PREWITT
BY
Frank H. Borden
ATTORNEY

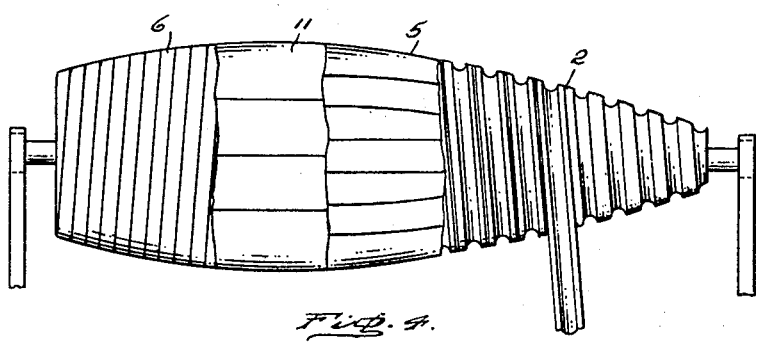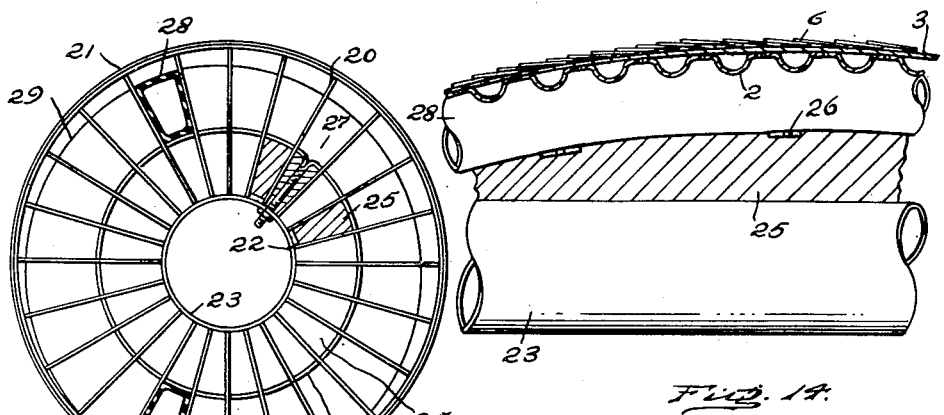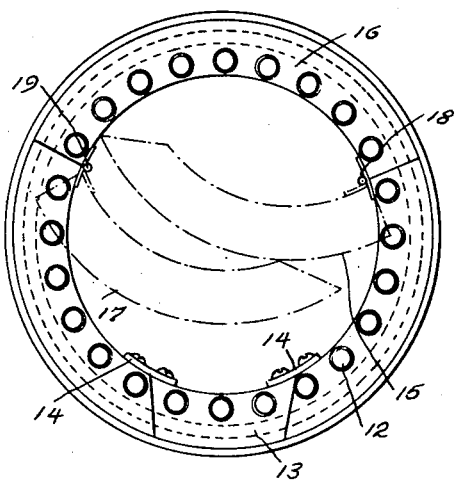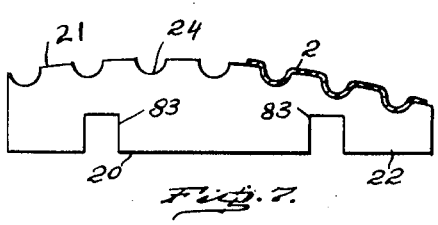

Sept. 11, 1956          R. H. PREWITT          2,762,419
METHOD AND APPARATUS FOR FABRICATING AIRFRAMES
Original Filed Sept. 2, 1948          3 Sheets-Sheet 3
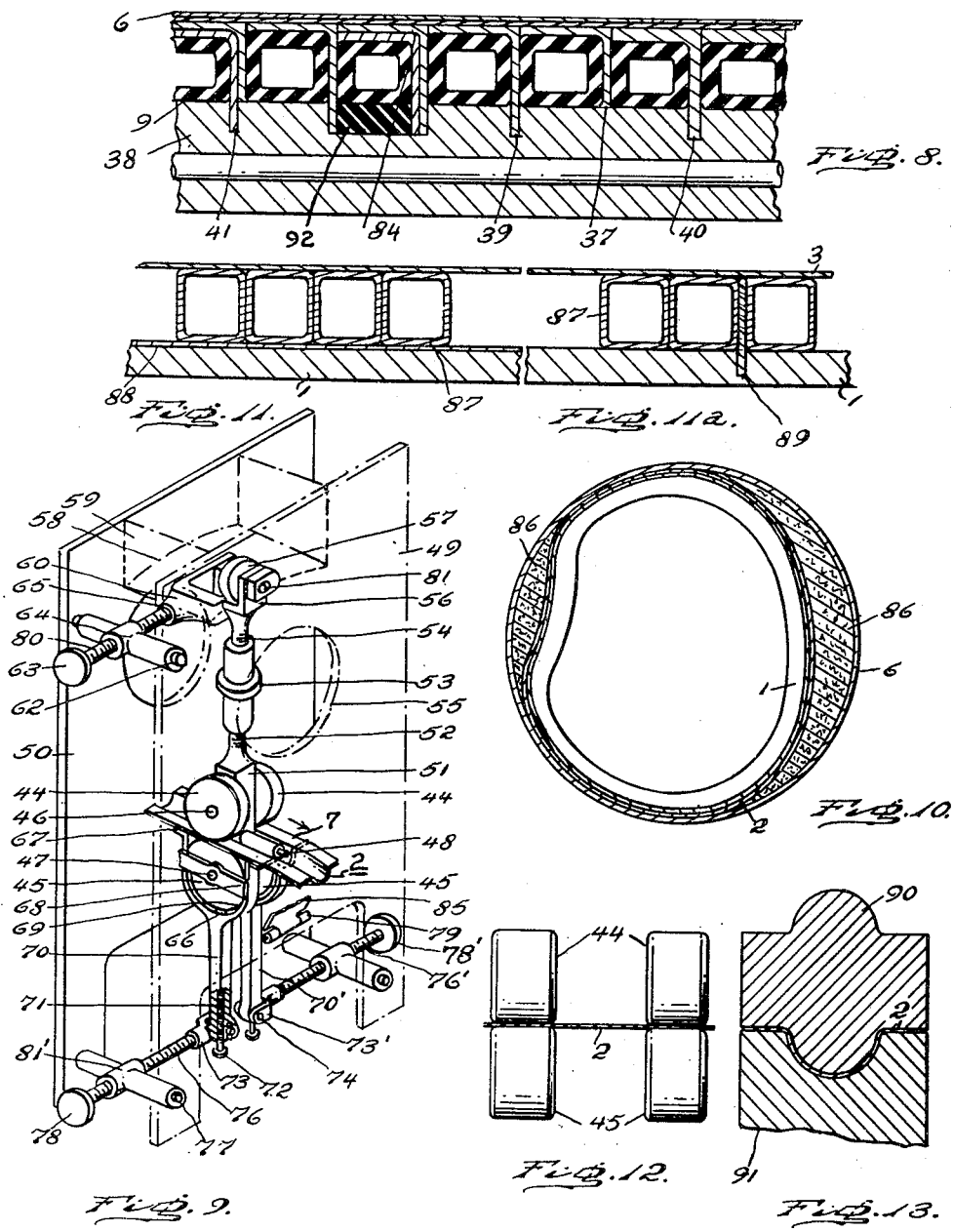
INVENTOR
RICHARD H. PREWITT
BY
Frank H. Borden
ATTORNEY United States Patent Office 2,762,419
Patented Sept. 11, 1956

2,762,419
METHOD AND APPARATUS FOR FABRICATING AIRFRAMES

Richard H. Prewitt, Wallingford, Pa.

Original application September 2, 1948, Serial No. 47,487. Divided and this application May 13, 1952, Serial No. 287,561

6 Claims. (Cl. 154—1.8)

Introduction

Prior to World War II there had been no production of aircraft, and therefore, the methods of fabricating airframes were developed primarily for small quantity reproduction. The expansion in the engineering department of airframe manufacturers was so rapid with the advent of World War II that litle thought could be devoted to completely revising methods of airframe manufacture since there were already many problems connected with the present processes. It was therefore natural that circumstances prevented any major changes in airframe design during the course of World War II. Likewise, certain fastening methods now in use were not available to the aircraft design engineers at that time.

During the war the Chrysler Corporation developed an adhesive method of attaching metal to metal and conducted many tests to prove this adhesive to be both adequate and reliable when properly processed. However, the adaptation of this adhesive to current airframe design did not prove economical except in a few cases. The development of adhesives has progressed by leaps and bounds by both the Chrysler organization and many others. It is possible today to obtain an adhesive which will attach a brake lining to the brake band without rivets and permits much greater wear life, giving very satisfactory results under all operating conditions, including extremely high heat cycles. Other adhesives are obtainable which give shear strengths up to 8,000 p. s. i. The brittleness of adhesives as well as many other characteristics may now readily be controlled in their manufacturing processes.

This invention relates to efficient use of materials in economical fabrication of airframes and other containers, and structures including missiles, fuselages, wings, tails, fairings, cowlings, doors and corresponding parts for other industries, etc. It utilizes adhesives to hold the parts together.

Description of process

Fundamentally the process involves a spiral winding of a formed member over a mandrel manufactured to receive the formed member and hold it in proper position while the external skin is being applied and adhesively attached to it. External pressure is applied either through a spirally wound strip of skin or through an external shell or local pressure pad. Internal pressure is applied through fluid pressure within a flexible tube or within a conduit forming part of the structure. The entire unit may be adhesively assembled in one curing operation.

General description

Figure 1 shows one method of processing a geodetic form of structure.

Figure 2 shows a similar method of processing another type of structure.

Figure 3 is a sectional view of the structures shown in Figures 1 and 2 including a portion of the fixture and external envelope.

Figure 4 illustrates a process modification of the structure illustrated in Figure 2.

Figure 5 illustrates a method of removing the mandrel used in process of fabrication illustrated in Figures 1, 2 and 4.

Figure 6 is a transverse cross section showing another method of tooling for either of the constructions illustrated in Figures 1 and 2.

Figure 7 is an elevation view of one of a plurality of radially extending formers shown in Figure 6.

Figure 8 is a section showing a modification of the spiral stiffener illustrated in Figure 3.

Figure 9 is a perspective of a stiffener forming device also shown in Figure 1.

Figure 10 is a transverse cross section of an irregular structure showing the method of applying equal external pressure during the gluing operation.

Figure 11 is a section showing a second modification of the spiral stiffener illustrated in Figure 3.

Figure 11a is a modification of Figure 11 showing a non-sandwich structure with an internal attachment.

Figure 12 illustrates a use of the stiffener forming device shown in Figure 9.

Figure 13 shows a method of second stage forming the skin stiffener illustrated in Figure 3.

Figure 14 is a longitudinal cross section of the structure shown in Figure 6.

Figure 15 is a transverse view of the fabrication methods illustrated in Figure 1.

Detail description

Figure 1 shows a mandrel 1 on which formed skin stiffener member 2 has been wound, over which cover material 3 has been lap wound. The mandrel 1 may be turned at pivots 4 to facilitate the winding, under tension, of the stiffener member 2 and the skin member or wrapping of cover material 3. Reversible motor 32 driving through clutch 33 pinion 30 and ring gear 31 rotates mandrel 1. Switch 34 on strip tensioning and forming carriage member 35 controls the motor 32. Figure 1 shows one winding being applied. However, several windings may be applied concurrently thereby increasing the pitch of each wrapping making the skin stiffener and skin cross at an angle as illustrated. Carriage member 35 is traversed along the structure at the same rate as the pitch of the spiral windings through worm 36 and mating nut on carriage 35. Worm 36 can be made to reverse its direction through reverse gears 82. Carriage member 35 shown in detail in Figure 9 provides means of shaping and tensioning the wrappings. It may be seen that the permanent external skin wrapping 3 of Figure 1 will require pre-forming when used in conjunction with wrapping of a conical surface, as is the case in all surfaces of double curvature. I intend to use the device illustrated in Figure 9 arranged similar to that of Figure 12 for this forming.

Figure 2 is similar to Figure 1, except that in this case longitudinal skin members 5 replace the spiral skin member 3 and spirally wound external removable pressure member 6 is used to exert temporary external pressure on the assembly between the stiffener member 2 and the longitudinally extending permanent skin members 5. In this latter case the adhesive is attached to the flat portions of flanges 7 of skin stiffener 2 and to the inside of the longitudinally extending skin members 5. The remaining fixture may include a motor and drive and worm actuated strip tension producing and forming carriage as shown at 35, Figure 1.

Figure 3 is a sectional detail taken along a longitudinal radial line on Figure 2. It may be noted that the mandrel 1 is a shell incorporating suitable spirally turned grooves to accommodate the semi-circular part 8 of stiffener member 2. This mandrel also incorporates spiral recesses 9 lying between grooves 8. It is intended that a flexible pressure tube 10 be spirally wound into grooves 9 to provide heat and pressure at the glue line between faces 7 of skin stiffener 2 and the skin 5 or 3, as the case may be. An alternate is to provide pressure only with flexible tubes 10 and supply heat through steam pipes 12 which form a part of the mandrel member 1.

Figure 4 shows still another modification of Figures 1 and 2, in that the external pressure is applied through removable formed plates 11 over which suitable external pressure means are provided as by spirally wound removable member 6. The purpose of this alternate is to provide a more rigid external pressure to eliminate skin marking, as might occur by using the wrapping member 6, alone, for external pressure. In addition the external formed plates may be used on flat or concave surfaces. In this latter case it may be necessary to provide additional external pressure means as by building out beyond the plates so that wrapping 6 may continue to substantially circumscribe a circle even though the structure substantially deviates from a circle as illustrated in Figure 10. In other respects the apparatus and method of use of the organization shown in Figure 4 may take on the aspects of other devices described.

Figure 5 shows the structure and a method for removing internal mandrel 1 at the completion of the molding process. Wedge member 13 is removable by unscrewing plate members 14. Thereafter segments 15, 16, and 17 may either be removed individually or, if sufficient room is available, by hinging these members at pivots 18 and 19. The exact segmentation of the internal mandrel 1 will be controlled by the size of the opening and shape of the structure. Alternate steam heating pipes 12 are also illustrated on this figure.

Figure 6 shows an alternate structure and method of providing an internal holding fixture while assembling an airframe member or analogous structure. In this case a plurality of removable metal plates 20 are disposed on and extend radially from an inner tube 23. As shown in Figure 7 each carry a notched edge at 21 and a straight edge at 22. Straight edge 22 rests against the removable inner tube 23 at its inboard end and carries stiffener member 2 at its outboard end 21. The apertures or notches or recesses 24 of one plate are arranged in relatively staggered relation axially of the tube 23 relative to those of adjacent plates to establish an effective but discontinuous or interrupted spiral groove to fix the position of the spirally wound skin stiffener 2. Removable filler blocks 25 extend between each of the plurality of plate members 20 and a removable cable member 26 is fixed around filler blocks 25 to maintain them in forced relationship with plates 20 through suitable tensioning member at 27. Removable flexible tube member 28 extends from end to end of the structure being fabricated and may either be made of a single length of tubing, snaking back and forth between apertures 29 or individually formed and attached to common manifolds forming a part of the bulkheads at each end of the structure.

The outside skin for this arrangement may be any of those shown in Figures 1, 2, 3 and 4. The heat and pressure in this case are applied through the removable flexible tube member 28. The omega or the rectangular section of the formed stiffener member is particularly applicable when used in connection with the mandrel illustrated by Figures 6, 7 and 14, as this type of structure is less likely to affect the bag 28 adversely.

After the airframe component has been cured, i. e., after the application of a predetermined heat and pressure, the internal assembly may be readily removed by first removing internal tube 23. This may be facilitated by a longitudinal split in the tube, permitting a reduction in its diameter during disassembly of the mold. The general process for disassembly of the unit is to tap, as by hammer, on the inside of tube 23 knocking filler blocks 25 outboard after the pressure in tube 28 and tension in cable 26 has been relieved. This may be facilitated by suitable registered holes in tube 23. Once the wedge shaped filler blocks 25 have been forced outboard, plates 20 will be loose, and after removal of inboard tube 23, plates 20 may be moved inboard, thus permitting longitudinal movement of the entire mandrel assembly relative to the formed structure created through adhesively attaching skin stiffener 2 to skin member 3 or 5 as the case may be.

Figure 7 as noted shows one of the removable plates 20 illustrated in Figure 6. These plates are semi-scalloped along the upper edge so as to hold the skin stiffener 2 in proper position during assembly. Straight surface 22 of plate 20 is notched at 83 so as to permit the wrapping of tightening cable 26 illustrated in Figure 6. It may be noted that plates 20 are staggered longitudinally relative to each other or as noted the notches are staggered so as to permit proper pitch of the spiral groove for the spiral winding of skin stiffener member 2.

*Figure 8.*—In order to facilitate the attachment of internal fittings to the structure a modification of the skin stiffener as illustrated in Figure 8 may be utilized. In this case the removable pressure tube 9 is wound coincident with permanent skin stiffener member such as illustrated at 37 on removable mandrel 38 and as in the previous construction skin 3 or 5, as the case may be, is placed over the stiffener. Removable skin pressure member 6 is then spirally wound over the skin member or over intermittent formers as shown at 11 on Figure 4 as the case may be. This type of construction permits local lengthening at stiffening web member of the skin stiffener as at 39. Additionally, by splicing or filling skin stiffening members in desired locations the entire thickness and internally extending dimensions of the skin stiffener may be altered as by permanent heavy member illustrated at 40 or by the auxiliary permanent stiffener member 41 or by the auxiliary permanent stiffener along with the flange lengthened stiffener as illustrated at 84. Pressure for gluing the lower flange of L member 84 is obtained through lateral fluid pressure in rubber block 92. These locally stiffened and internally extending permanent web sections to the skin stiffener permit the addition of local stiffness or they provide a ready means for attaching internal fittings to the structure at singular or plural points.

I intend to form right angular skin stiffener members 37, 39, 40, 41 and 84 in tensioning and forming carriage 35. At the same time, I also intend to vary the flange depth in this same operation as by normally starting with the section sufficient to produce the maximum desired depth of flange and remove the undesired portion of this flange as required. The operation of the flange depth cutters of carriage 35 may readily be synchronized with the rotation of mandrel 1 about pivots 4 so as to automatically increase the depth of the flange at any previously determined arc of the structure at each turn of the mandrel as desired.

*Figure 9.*—One of the important phases of my invention comprises a mechanism which will properly shape formed skin stiffener member 2. This stiffener member having formed depth as well as the required circumferential forming involves stretching of the metal. Figure 9 shows the details of a suitable mechanism for forming the skin stiffener so that it will not only take up the curvature of the skin circumferentially but it also provides for graduated deformation of flange 7 and adjacent material as illustrated in Figure 12. It is proposed to pull either a flat section for initial deformation or substantially completed formed section through the sheet forming device of Figure 9. In other words, this device may be used for both forming the sheet and other similar devices or the same rearranged unit may again be used for final shaping. It is highly important that the flange 7 of the skin stiffener member 2 lie flat against the skin member 3 or 5 as the case may be, so as to obtain satisfactory adhesion between the skin and stiffener and smooth external skin irrespective of changes in shape of the structure being manufactured. This is accomplished in the final stage by use of the device shown in Figure 9. The flanges 7 of skin stiffener 2 are pulled between upper rollers 44 and lower rollers 45 with varying amounts of pressure between the rollers collectively to provide slight variations in the circumferential curvature; the rollers individually provide for conical wrapping; and graduated adjustment from side to side for the lower rollers individually makes the flanges 7 lie flat against the skin.

Specifically, upper rollers 44 turning on pivot 46 fastened in block member 51 may be adjusted vertically (for the application of collective changes in pressure for the 2 flanges) through turn buckle nut 53 threaded at 52 on block 51 and at 54 on upper block 56. Access to the adjustment may be had through hole 55 in plate 49. Block 51 carrying upper rollers 44 is pivoted in vertically extending slots (not shown) at 48, located in plates 49 and 50. The slot permits the vertical movement of the upper roller assembly and the pivot permits differential pressure to be applied on the left and right flanges of stiffener member 2. The latter differential action is controlled through knurled knob 63 carrying threaded member 80 which mates the female thread in cross member 64 pivoted at 62 in plates 49 and 50. At the juncture of screw thread 80 and yoke member 60 as shown at 65 suitable flanges on threaded member 80 permit rotation between these members, but without effective longitudinal play. Pin 81 attaches yoke members 60 and 56 with roller 57 which is free to turn on pin 81. The compressive force required to roll flanges 7 of skin stiffener 2 is taken through rollers 44, hub pivot 46, block 51, turn buckle 53, yoke 56, roller 57 to the surface of block member 59 which is bolted between plates 49 and 50. The lower surface of block 59 is radially curved as at 58 about pivot 48. This permits adjustment of knob 63 without changing the total force between rollers 44 and flanges 7 of skin stiffener 2. However, adjustment of knob 63 causes differential rolling of the flanges 7 so that one is rolled to a greater extent than the other.

Lower rollers 45 (right hand roller not fully shown, but mating upper roller 44) are fixed vertically, but are permitted to be adjusted individually about pivot 67 which lies very close to the flange 7 of skin stiffener 2. Pivot 67 fulcrums in plates 49 and 50 (fulcrum for plate 49 on the near roller and for both plates on the other roller not shown). Specifically, rollers 45 are pivoted at 47 in web member 68 which is carried by fork member 69 on hollow stem 70. Brake shoe 66 whose pressure is controlled through knurled knob 72 which threads into the end of member 70 brings pressure on brake plate 66 through spring member 71. The purpose of brake 66 is to put friction on roller 45 so as to put a tension in skin stiffener member 2 when being wrapped on the mandrel 1. Knurled knob 78 carries thread member 76 which screws through female threaded member 81 pivoted in plates 49 and 50 at 77. The connection between threaded member 76 and yoke member 73 permits rotation between these 2 members as described above between members 60 and 80, permitting rotation without end motion. Yoke 73' is pivoted to arm 70' at 74, with individual position controlling screw 76' controlled by knob 78', thus it can be seen that adjustment of the individual knurled knob 78 and 78' permits individual angular adjustment of rollers 45 thereby permitting a heavier or lighter rolling on the outside or inside of flange 7 of stiffener 2, thereby permitting adjustments which will let flange 7 lie flat on mandrel 1 with changes in curvature. At the same time, upper roller assembly 44 will permit minor changes in the radius of curvature of the skin stiffener as a whole collectively or about the center of the unit. In this manner the shape of the skin stiffener may be completely adjusted to fit the grooves of mandrel 1 and at the same time to permit flange 7 to lie flat against the skin for all changes in curvature of the structure being manufactured.

Since friction shoe 66 as well as the rolling operation will cause a tension to be put in skin stiffener member 2 as it leaves the forming member 35 shown in Figure 9 it will be necessary to support this curved skin stiffener between the time it leaves the rollers 44 and 45 and the time it is wrapped onto the mandrel 1. This is better illustrated in Figure 15. A fragmentary portion of this member is shown in Figure 9 at 85 pivoted to skin stiffener device plate 49 at pivot 79.

Figure 10 shows a method of handling irregular cross sectional shape structures. In this case, after having the skin stiffener and skin properly wrapped pressure may be applied, as described above, provided suitable removable padding such as that shown at 86 is applied between the wrapped structure and the external removable pressure member 6. The pressure pads 86 can be made in a number of ways, but it is preferable that they not be subject to substantial compressive deformation between the skin member 3 or 5 as the case may be, and the external wrapping member 6. The main point here is that the external wrapping member 6 forms substantially a circle when wrapped over the structure including padding members 86.

Figure 11 illustrates a third form of structure described in this invention. In this case square tubular material illustrated at 87 is spirally wound on mandrel 1. If so desired a sandwich type construction may be utilized in this process provided an initial wrapping, or positioning, of inner skin 88 is accomplished prior to wrapping square tubular member 87. In the non-sandwich structure shown in Figure 11a an auxiliary plate 89 illustrates a method of providing for internal attachments or additional bulkhead stiffness as desired. The bulkhead stiffener member 89 may be formed as described herein by rolling the outside of this member sufficiently to cause it to bend around in the desired shape. The skin 3 or 5, as the case may be, is applied as in the other constructions and all contacting surfaces are properly treated and surfaced with adhesive. In this case both heat and internal pressure are applied by placing steam or suitable liquid through the square tubes 87 until proper curing of the adhesive has been obtained.

Figure 12 shows one use of the device shown in Figure 9. In this case a substantially flat sheet is pulled between rollers so as to lengthen the material pulled under the rollers in relation to the rest of the member. Utilizing this as a first forming operation the bead can be made to readily circumferentiate around the structure as desired.

Figure 13 illustrates a rolling of the bead stiffening member being processed initially as illustrated in Figure 12 and the final processing is shown in Figure 9. In Figure 13 upper male roller 90 and lower female roller 91 are arranged to symmetrically form a longitudinal bead in skin stiffener 2 including allowances for springback.

Figure 14 is a longitudinal section through Figure 6 between plates 20. This view shows wooden block 25 adjacent to internal tube member 23 at the lower edge and adjacent to flexible bag 28 at the upper edge. This view also illustrates stiffeners 2, skin 3 or 5 and wrapper 6 illustrated in shingled formation. It may be necessary to overlap outside wrapper 6 or smooth external surface may be had by making the edges butt against succeeding wrappings.

Figure 15 shows a side view of the skin stiffener bridge 85 fragmentarily illustrated in Figure 9. In this case stiffener member 2 is wrapped on mandrel 1 and is finally formed in carriage device 35 which carries bridge slide or support member 85. The upper surface of bridge slide member 85 has a curvature substantially that of mandrel 1. One end of this bridge is pivoted on stiffener forming carriage member 35 at 79 (illustrated in Figure 9) and the other edge rides on mandrel 1.

It is intended that adjacent faces of structure to be fixed together by adhesives will be properly cleaned, dried adhesive or adhesives applied, such adhesives to be cured under pressure and heat according to their individual requirements. Generally speaking both pressure and heat may be applied through steam injected into the various flexible non-structural and/or structural tubes illustrated; however I also intend to apply heat through additional steam pipes or other heat application either from internally or externally of the fixture.

The word adhesive referred to herein is intended to cover all means of surface attachment including hot and cold setting adhesives and metal bonding, such as brazing where desired. The adhesives with their catalysts, where applicable, and the brazing metal and its flux may either be sprayed onto the surface or applied in sheet form as desired.

Having described this invention, it can readily be seen that the number of irregular pieces coming into the manufacture of an airframe or comparable structures is reduced to an absolute minimum, and the time involved in assembling these members is also reduced to an absolute minimum. It would appear entirely possible to reduce the man hours required to fabricate airframe structures to a point such that less than one-fifth of the man hours required in present airframe consrtuction would be required in the proposed construction. In addition, a structural analysis of the proposed construction (involving a skin supported at short intervals by bulkheads) will permit the greatest strength utilization of the skin material which may be made extremely thin.

The ease of locally altering the structure and process taught in this invention is remarkable. The internal stiffening structure may be doubled in thickness by the simple expedient of wrapping a second layer on top of the first layer, the second layer being adhesively treated all over. Likewise the thickness or size of the internal stiffener may be altered as desired. In a similar manner the skin thickness may be altered as desired by successive additional sheets or by varying the thickness of the sheets.

This invention includes processing from raw material to finished product. Specifically it is anticipated that generally rolled stock will be cleaned and processed through slitters to provide proper widths of sheets. The sheets will then be formed and wrapped on a mandrel for final forming, curing and processing.

This application constitutes a division of application Serial No. 47,487, filed September 2, 1948, now abandoned.

Having thus described my invention, I claim:

1. In the manufacture of a structure, an internal mandrel comprising a removable internal member, a plurality of longitudinally extending generally radially projecting plates having external and internal edges, said plates being notched on their external edges to receive a spirally wound structural member, said plates mounted against said removable internal member on their internal edges, positioning blocks between the radially inboard surfaces of said plates, means for retaining said positioning blocks in place, and a pressure and heat bag disposed and filling the space between said plates, said blocks and said spirally wound structural member.

2. In the manufacture of a structure comprising an internal member and a skin connected by adhesive, an internal mandrel of irregular cross section arranged to receive said internal member and to form it into an incompletely annular member of irregular cross section, an external forming pad arranged to fit against the external face of the skin and having its outside surface curved circumferentially to merge into the structure to form therewith a regular annular cross section, an external tensioning member wrapped around the structure and pad as a substantially annular assembly and means for applying heat and pressure to the adhesive between the internal member and skin.

3. In the manufacture of a structure comprising an internal spirally wound member and a superposed skin, the meeting surfaces of which are substantially coated with adhesive, an internal mandrel of non-annular cross section arranged to receive said internal member and to form it into an incompletely annular form, an external forming pad arranged to fit against the external face of the skin and having its outside surface curved circumferentially to merge into the structure to form therewith a regular annular cross section, an external tensioning member wrapped around the structure and pad assembly and means for applying heat and pressure to the adhesive between the meeting surfaces of the member and skin.

4. In a structure, having an inner spirally wound stiffening section having flanges and a superimposed stiffening skin, the method of fabrication which consists in disposing adhesives on all meeting surfaces of the spirally wound section and the stiffening skin, imposing a removable anvil covering to the skin, and applying pressure directly to the flanges only of said spirally wound stiffening section toward said skin and maintaining the pressure during curing, then removing the external anvil covering and the pressure applying means.

5. The method of forming a structure utilizing a spirally grooved collapsible mandrel and a section-forming roller assembly, which comprises forming a continuous length of flanged section, winding the length as formed directly to said mandrel in the grooves thereof, applying adhesive to the external face of the flanged section, applying stiffening skin means to the adhesive coated flanged section, applying heat and pressure to cure the adhesive and bond the flanges of the stiffening section to the skin, then removing the mandrel.

6. In structure forming apparatus, a spirally grooved collapsible mandrel, a spirally wound resilient pressure device mounted in a spiral groove, means for forming a flanged stiffener member and for feeding it as formed to the mandrel so that the flange thereof overlies the resilient pressure device, a removable external anvil covering for a skin stiffener superimposed on the flanges of the spirally wound stiffener member, adhesive between said flanges and said skin stiffener, said anvil arranged to exert external pressure on the stiffener flanges and skin and adhesive between same in response to pressure developed in said pressure device.

References Cited in the file of this patent

UNITED STATES PATENTS

| | | |
|---|---|---|
| 1,726,279 | Werner | Aug. 27, 1929 |
| 2,314,510 | Odor | Mar. 23, 1943 |
| 2,337,373 | Chernack | Dec. 21, 1943 |
| 2,343,747 | Chernack | Mar. 7, 1944 |
| 2,351,152 | Schick | June 13, 1944 |
| 2,360,047 | Caminez | Oct. 10, 1944 |
| 2,376,762 | Ferguson | May 22, 1945 |
| 2,394,730 | Vidal et al. | Feb. 12, 1946 |
| 2,451,131 | Vidal et al. | Oct. 12, 1948 |
| 2,491,857 | Greiner | Dec. 20, 1949 |
| 2,539,814 | Chernack | Jan. 30, 1951 |
| 2,540,482 | Hervey | Feb. 6, 1951 |
| 2,557,932 | Baymiller | June 26, 1951 |
| 2,579,858 | Price | Dec. 25, 1951 |
| 2,636,541 | Rutherford | Apr. 28, 1953 |
| 2,693,779 | Padgett | Nov. 9, 1954 |